United States Patent

[11] 3,629,942

| [72] | Inventor | Joseph Leo Guay<br>169 Maplewood Ave., Hamilton, Ontario, Canada |
|---|---|---|
| [21] | Appl. No. | 8,956 |
| [22] | Filed | Feb. 5, 1970 |
| [45] | Patented | Dec. 28, 1971 |
| [32] | Priority | Feb. 6, 1969 |
| [33] | | Canada |
| [31] | | 042,199 |

[54] GRASS TRIMMER
2 Claims, 2 Drawing Figs.

[52] U.S. Cl..................................................... 30/248, 56/241
[51] Int. Cl..................................................... B26b 13/00
[50] Field of Search........................................... 30/227, 243, 248, 252, 250; 56/240, 241, 242

[56] References Cited
UNITED STATES PATENTS

| 561,479 | 6/1896 | Bluntach........................ | 56/242 |
| 619,644 | 2/1899 | Walters.......................... | 56/242 |
| 911,073 | 2/1909 | Rober............................ | 56/240 |
| 1,032,485 | 7/1912 | Karcher......................... | 56/240 |

Primary Examiner—Theron E. Condon
Assistant Examiner—J. C. Peters
Attorney—Lawrence I. Field ABSTRACT: A grass trimmer having a wheeled framework with shears projecting forwardly therefrom, gearing associated with the shears for actuating the shears rapidly as the gearing is operated slowly and manually operated means for operating the gearing.

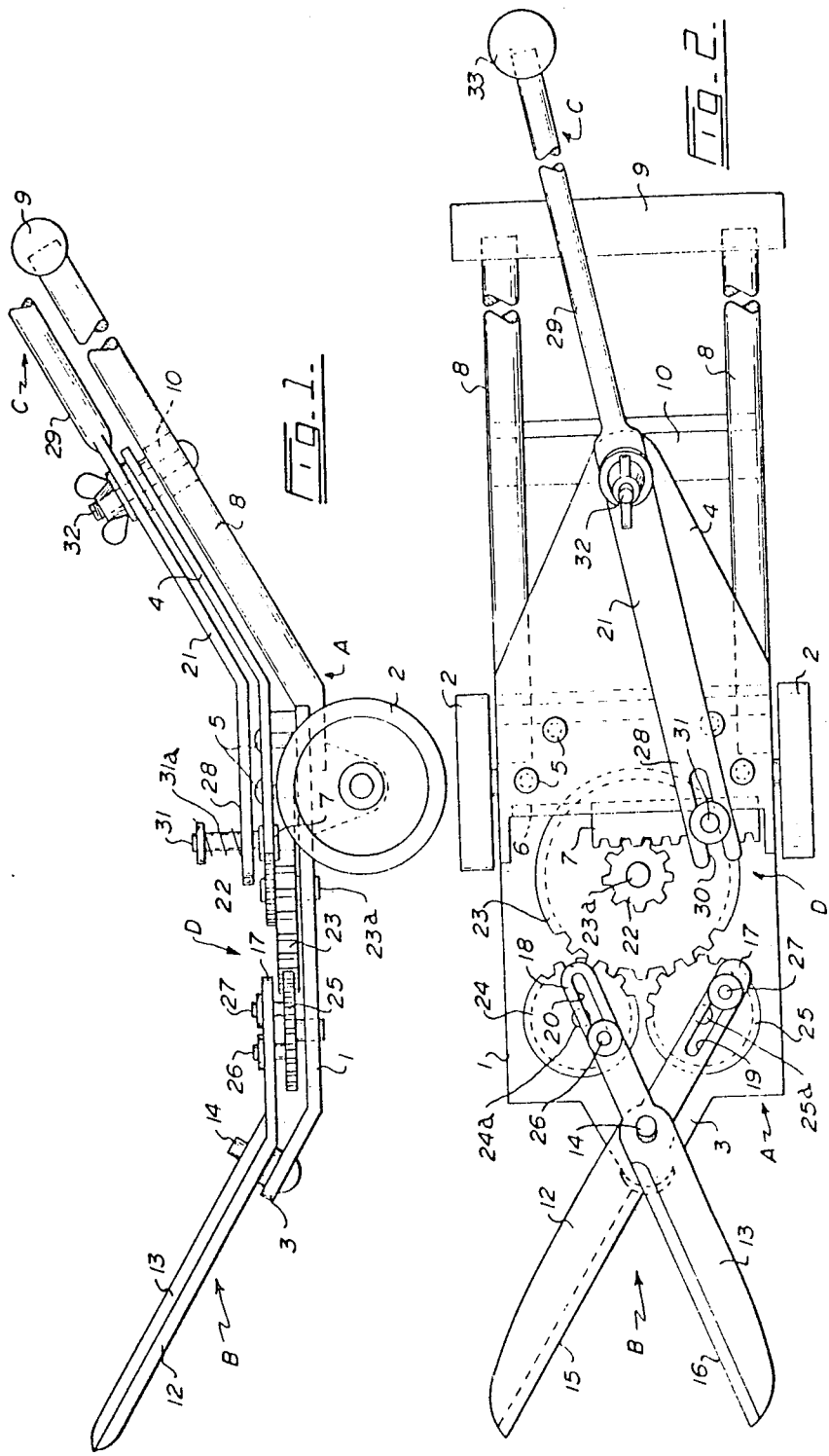

GRASS TRIMMER

BACKGROUND OF THE INVENTION

1. Field of the Invention

This invention relates generally to cutting devices and particularly to improvements in grass trimmers or shears.

2. Description of Prior Art

In gardening, it is customary to trim the edges of lawns close to sidewalks, flower borders and the like. Various cutting devices have been used for this operation including conventional hedge-trimming shears, shears that may be operated by one hand similarly to shears used in shearing wool from sheep or one-hand operated shears similar to ordinary scissors. While such devices operate satisfactorily to trim lawns, they all suffer from the disadvantage that the user must either kneel on the grass surface or must bend over sufficiently to bring the device down to the level necessary for the grass-trimming operation.

In an effort to overcome the necessity of kneeling or bending, there have been provided shears mounted at the lower end of a vertical rod with support wheels provided immediately behind the shears. A linking mechanism then couples the shears to a handle provided with means which may be squeezed by the hand holding the handle while the user is in a standing position, to operate the shears. While devices of this nature will function satisfactorily, the simple linking mechanism coupling the shears to the handle is such that the shear blades may close only once as the handle is squeezed and, unless the handle is squeezed with a high frequency to operate the shears frequently, the grass cutting operation is unduly prolonged. In addition, the necessary frequent squeezing operation of the actuating handle means, leads to fatigue on the part of the operator which again adds to the difficulty of the grass trimming operation.

SUMMARY OF THE INVENTION

The present invention provides an improved grass trimmer including shears mounted at the forward end of a wheeled frame with gearing mounted rotatably on the framework and connected to the shears so that the shears may be actuated rapidly by operation of the gearing.

Further, the present invention provides means for operating the gearing without undue effort on the part of the operator.

In a preferred embodiment, a rack and pinion mechanism is associated with the gearing and is adapted to be manipulated manually to operate the gearing and thereby actuate the shears.

In addition, the present invention provides the advantage that the rack and pinion and gearing may be constructed so that the shears will be opened and closed rapidly to provide rapid cutting action while the rack and pinion mechanism is moved slowly back and forth.

Further, the present invention provides a device wherein the operator at all times stands erect, pushing the device in front of him during the grass-trimming operation.

BRIEF DESCRIPTION OF THE DRAWINGS

In drawings illustrating a preferred embodiment:

FIG. 1 is a side elevation illustrating the general arrangement of the parts of the device with the pushing and actuating handles partly broken away;

FIG. 2 is a top plan view of the embodiment illustrated in FIG. 1 again with the actuating and pushing handles partly broken away.

DESCRIPTION OF THE PREFERRED EMBODIMENT

In general, this invention includes the supporting framework A, shears B mounted at the forward end of the framework, an actuating handle C mounted at the rear end of the framework and rack, pinion and gear mechanism D mounted on the framework A and adapted to be operated by the actuating handle C to open and close the shears B.

The framework A, in the embodiment illustrated, includes a substantially rectangular, horizontal main frame 1 mounted on supporting wheels 2—2 and formed with a tapering forwardly projecting front end 3 and a tapering rearwardly projecting rear end 4. The ends 3 and 4 each are inclined upwardly at an angle to the main frame 1 as seen in FIG. 1 in the drawings. In the illustrated embodiment, the rear end 4 is not integral with the main frame 1 but is fastened thereto with rivets 5. The forward edge of the rear end 4 is raised to provide a lateral channel 6 to receive the rack 7 as will be described below. A pushing handle is provided at the rear of the main frame 1, in the form of a pair of spaced arms 8—8 secured at their lower ends to the frame 1 and inclined upwardly and rearwardly substantially parallel to the rear end 4. At their upper ends, the arms 8—8 are bridged by a bar 9 and are stiffened with a cross brace 10 located adjacent the upper end 11 of the rear end 4.

The shears B include a pair of cooperating blades 12 and 13 pivotally connected approximately midway of their length and fastened to the forward end 3 by a fastening pin 14. The shears B are formed with the blades 12 and 13 disposed at an angle with respect to their opposite ends 17 and 18 and, when connected to the forward end 3, the blades 12 and 13 will lie substantially parallel to the end 3 while the opposite ends 17 and 18 will lie substantially parallel to the main frame 1. The blades 12 and 13 are provided with the usual cutting edges 15 and 16. The end 17 of the blade 12 is provided with a longitudinal slot 19 and the end 18 of the blade 13 is provided with a similar slot 20. Consequently, as the rear ends 17 and 18 are moved towards or away from each other, the cutting edges 15 and 16 open and close in a shearing action.

The actuating means C includes an actuating handle 21, a rack 7, a pinion 22, a large driving gear 23, a pair of smaller driven gears 24 and 25 and pins 26 and 27 which are adapted to fit in and slide in the slots 19 and 20 in the ends 17 and 18.

The actuating handle 21 is formed with a section 28 lying substantially parallel to the main frame 1 and a section 29 at an angle to the section 28 and lying substantially parallel to the rear end 4. At its forward end, the section 28 is bifurcated to form a slot 30 which is connected to an upstanding pin 31 on the rack 7. A spring 31a encircles the pin 31 to bear on the slotted end 30 and compensate for any uneveness in action during movement of the actuating handle 21. The section 29 of the handle is connected pivotally to the rear end 4 by a pin 32 which extends through the end 4 and cross brace 10 to provide a rigid connection. At its upper end, the section 29 is provided with a ball 33 whereby the handle may be grasped and moved backwardly and forwardly on the pin 32.

The large driving gear 23 and pinion 22 are mounted rotatably on the main frame 1 by an axle 23a with the pinion 22 fastened to the large driving gear 23 so that movement of the pinion will result in simultaneous movement of the driving gear 23. The pinion 22 is in toothed engagement with the rack 7 which may be operated slidably in the lateral channel 6 by movement of the actuating handle 21. The driving gear 23 is in toothed engagement with the pair of spaced driven gears 24 and 25 which are mounted rotatably on the main frame by axles 24a and 25a. The pins 26 and 27 are offset on the driven gears 24 and 25 and project upwardly from the gears into sliding engagement with the slots 19 and 20 in the ends 17 and 18.

In operation, the device is assembled substantially as illustrated and described. With the shears B in the raised position as illustrated in FIG. 1, the device may be pushed by the bar 9 to the location where the grass is to be trimmed. The shears B then are lowered by raising the bar 9 to tilt the entire apparatus on the wheels 2—2 and so that the shears B will lie substantially parallel to the ground surface. Thereafter, the device may be pushed forwardly and, as the actuating handle 21 is moved backwardly and forwardly on the pin 32, the resultant backward and forward movement of the rack 7 will operate the shears through the main driving gear 23 and the driven gears 24 and 25 so the blades 12 and 13 will open and close in a shearing action to trim the grass as desired.

In the preferred embodiment described and illustrated, a rack and pinion mechanism is associated with the gearing so that movement of the rack and pinion mechanism will result in rotation or operation of the gearing to in turn actuate the shears. The gear ratios involved in the gearing and in the rack and pinion mechanism are then adjusted so that relatively slow movement of the rack and pinion mechanism backwardly and forwardly will result in sufficient speed of rotation of the gearing so that the shears will be opened and closed at least twice for each movement of the rack in one direction.

It will, of course, be obvious that various other mechanisms may be employed for operating the gearing to actuate the shears. For example, an auxiliary driving gear may be in mesh with the teeth of the large driving gear 23 to rotate the large gear 23 as the driving gears rotated and rotation of the gear may be accomplished through a flexible cable or shaft extending to an actuating crank located at the point where it may be manipulated easily by the operator of the device. This will have the same effect of rotating the gearing and it will be relatively simple to adjust the gearing ratios to again actuate the shears for the desired cutting action as the device is moved in front of the operator.

I claim:

1. In a manually operable grass trimmer:
a supporting framework;
shears mounted operably on the framework to project forwardly therefrom;
gearing mounted rotatably on the framework for actuating the shears rapidly as the gearing is operated slowly, said gearing including a pair of driven gears mounted for rotation on the frame with pins upstanding from each gear and connected operatively to the shears to actuate the shears on rotation of the pair of gears and a driving gear mounted rotatably on the frame in driving engagement with the driven gears; and
manually operable means for actuating the gearing including a pinion mounted on the driving gear for rotating the driving gear, a rack mounted slidably on the frame in driving engagement with the pinion and an actuating handle connected to the rack and adapted to be operated manually to move the rack.

2. In a manually operable grass trimmer:
a supporting framework including a substantially horizontal main frame having an upwardly inclined front end and an upwardly inclined rear end, wheels rollably supporting the framework, pushing handle means connected to the framework to project rearwardly therefrom and inclined upwardly substantially parallel to the rear end;
shears mounted operably on the upwardly inclined front end of the framework to lie substantially parallel to the said front end;
gearing mounted operably on the framework for actuating the shears rapidly as the gearing is operated slowly, including a pair of driven gears mounted rotatably on the frame with pins upstanding from each gear and connected operatively to the shears to actuate the shears on rotation of the gears, a driving gear mounted rotatably on the frame in speed-increasing driving engagement with the driven gears;
manually operable means carried by the framework for actuating the gearing including a pinion mounted on the driving gear for rotating the driving gear, a rack mounted slidably on the frame in driving engagement with the pinion and an actuating handle having an operable connection with the rack and adapted to be operated manually to actuate the rack.

* * * * *